(12) United States Patent
Wu

(10) Patent No.: US 9,220,029 B2
(45) Date of Patent: Dec. 22, 2015

(54) METHOD OF HANDLING MINIMIZATION OF DRIVE TESTS MEASUREMENT AND RELATED COMMUNICATION DEVICE

(75) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 144 days.

(21) Appl. No.: 13/190,500

(22) Filed: Jul. 26, 2011

(65) Prior Publication Data

US 2012/0028611 A1 Feb. 2, 2012

Related U.S. Application Data

(60) Provisional application No. 61/367,881, filed on Jul. 27, 2010, provisional application No. 61/407,607, filed on Oct. 28, 2010.

(51) Int. Cl.
*H04W 40/00* (2009.01)
*H04W 24/10* (2009.01)
*H04W 24/08* (2009.01)
*H04W 60/06* (2009.01)

(52) U.S. Cl.
CPC .............. *H04W 24/10* (2013.01); *H04W 24/08* (2013.01); *H04W 60/06* (2013.01)

(58) Field of Classification Search
CPC ..... H04W 24/10; H04W 24/08; H04W 60/06; H04W 24/02
See application file for complete search history.

(56) References Cited

U.S. PATENT DOCUMENTS

| 8,478,200 B2* | 7/2013 | Kim ...................... H04W 24/10 370/335 |
| 2009/0061879 A9* | 3/2009 | Gallagher et al. ............ 455/439 |
| 2010/0190488 A1* | 7/2010 | Jung ...................... H04W 24/10 455/424 |
| 2011/0201279 A1* | 8/2011 | Suzuki .................. H04W 24/10 455/67.11 |
| 2013/0109320 A1* | 5/2013 | Tomala et al. ............. 455/67.11 |

FOREIGN PATENT DOCUMENTS

| JP | 2002532988 A | 10/2002 |
| JP | 20125031 A | 1/2012 |

OTHER PUBLICATIONS

NTT Docomo, Inc., "MDT support for roaming and network sharing scenarios", 3GPP TSG-RAN WG2 #70, R2-102997, May 10-14, 2010, pp. 1-4, Motreal, Canada.
3GPP TS 23.122 V9.3.0 3rd Generation Partnership Project; Technical Specification Group Core Network and Terminals; Non-Access-Stratum (NAS) functions related to Mobile Station (MS) in idle mode (Release 9), Jun. 2010.

(Continued)

*Primary Examiner* — Ajit Patel
(74) *Attorney, Agent, or Firm* — Winston Hsu; Scott Margo

(57) ABSTRACT

A method of handling minimization of drive tests, hereafter called MDT, measurement for a mobile device in a wireless communication system is disclosed. The method includes registering to a first public land mobile network, and maintaining MDT measurement configuration when the UE registers to a second public land mobile network belonging to an operator as the first public land mobile network is, or the UE is in coverage of the first public land mobile network but registering to no public land mobile network.

3 Claims, 8 Drawing Sheets

(56) References Cited

OTHER PUBLICATIONS

3GPP TS 24.008 V9.3.0 3rd Generation Partnership Project; Technical Specification Group Core Network and Terminals; Mobile radio interface Layer 3 specification; Core network protocols; Stage 3 (Release 9), Jun. 2010.
3GPP TS 24.301 V9.3.0 3rd Generation Partnership Project; Technical Specification Group Core Network and Terminals; Non-Access-Stratum (NAS) protocol for Evolved Packet System (EPS); Stage 3 (Release 9), Jun. 2010.
3GPP R2-104212 3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10), Jun. 2010.
European patent application No. 11006166.0, European Search Report mailing date: Oct. 20, 2011.
NTT Docomo, Inc., "MDT support for roaming and network sharing scenarios", 3GPP TSG-RAN WG2 #70bis, R2-103873, Jun. 28-Jul. 2, 2010, Stockholm, Sweden, XP050451273, p. 1-3.
HTC, "Removing Logged MDT configuration and log in PLMN change", 3GPP TSG-RAN WG2 #71, R2-104308, Aug. 23-27, 2010, Madrid, Spain, XP050451815, p. 1.
TeliaSonera, Ericsson, ST-Ericsson, "Impact of PLMN changes on MDT", 3GPP TSG-RAN WG2 Meeting #71bis, R2-105421, Sep. 11-15, 2010, Xi An, China, XP050452327, p. 1-2.
3GPP TS 37.320 V1.0.0 (Aug. 2010), "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)", XP050442198, cover page+ p. 3-15.
3GPP TS 37.320 V1.1.0 (Oct. 2010), "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)", XP002660859, cover page+ p. 3-17.
HTC, "Clear MDT configuration and logs in detached state", 3GPP TSG-RAN2 meeting #72, R2-106220, Oct. 15-19, 2010, Jacksonville, USA, XP050467055, p. 1-2.
LG Electronics Inc., Log handling during UE power off, 3GPP TSG-RAN2 Meeting #71, R2-104841, Aug. 23-27, 2010, pp. 1-2, Madrid, Spain.
Office Action mailed on Jan. 20, 2015 for the Japanese Application No. 2014-080458, filing date Apr. 9, 2014, pp. 1-3.
LG Electronics Inc., Indication of MTD log availability, 3GPP TSG-RAN2 Meeting #70, R2-103244, May 10-14, 2010, pp. 1-2, Montreal, Canada.
Office action mailed on Jan. 28, 2014 for the Japanese application No. 2013-055585, filing date Mar. 18, 2013, pp. 1-3.

\* cited by examiner

METHOD OF HANDLING MINIMIZATION OF DRIVE TESTS MEASUREMENT AND RELATED COMMUNICATION DEVICE

CROSS REFERENCE TO RELATED APPLICATIONS

This application claims the benefit of U.S. Provisional Application No. 61/367,881, field on Jul. 27, 2010 and entitled "Method and Apparatus for handling MDT measurement configuration and log in a wireless communication system", and No. 61/407,607, field on Oct. 28, 2010 and entitled "METHOD AND APPARATUS FOR HANDLING MDT MEASUREMENT CONFIGURATION AND LOG IN A WIRELESS COMMUNICATION SYSTEM", the contents of which are incorporated herein in their entirety.

BACKGROUND OF THE INVENTION

1. Field of the Invention

A method utilized in a wireless communication and related communication device are disclosed, and more particularly, to a method of handling minimization of drive tests measurement in a wireless communication system and related communication device.

2. Description of the Prior Art

Coverage is something that a customer can easily notice through the terminal user interface (UI) (i.e. out-of-service area indication), and is a major criteria that a customer considers when comparing service provided by different operators. With the increase in data service provision, downlink throughput is also an important criterion by which many customers judge the performance of the network. Poor uplink coverage will impact user experience in terms of call setup failure/call drop/poor uplink voice quality.

Accordingly, it is very important for operators to be aware of the coverage/throughput their networks provide, and rigorous "drive tests" are performed to collect such information. However, what has to be taken account of is that the drive tests for network optimization purposes is costly and causes also additional CO2 emissions, so it is desirable to develop automated solutions, including involving UEs in the field, in 3GPP to reduce the operator costs for network deployment and operation. Therefore, minimization of drive tests (MDT) functionality involving measurement is performed or logged by UE to collect information (or called measurement logs) in idle mode or connected mode, to reduce network maintenance costs for operators, ensure faster optimization cycle resulting in higher customer satisfaction and nonetheless help to reduce the carbon emission to protect the environment.

Note that, for MDT, measurement configuration, measurement collection and reporting of the concerning measurement will always be done in cells of the same radio access technology (RAT) type. In addition, MDT measurement configuration is provided in a cell by dedicated control while the UE is in RRC connected mode and implies that measurement configuration is valid in radio resource control (RRC) idle mode, measurement configuration and logs are maintained when the UE is in the RRC idle mode, and/or measurement configuration and logs are maintained when the UE is in that RAT. On the other hand, MDT measurement configuration and corresponding measurement logs are cleared by the UE at any public land mobile network (PLMN) change and switch off. The PLMN may rely on several RATs (e.g. Universal Mobile Telecommunications System (UMTS) and Long-Term Evolution (LTE)). An operator using UMTS or LTE can be identified by a PLMN code, which consists of a Mobile Network Code (MNC) and Mobile Country Code (MCC) pair.

However, the applicant notices that a UE may encounter validity problems associated to MDT measurement configuration and measurement logs as below based on a direct image on a basis of the prior art UMTS or LTE system.

In the first scenario, a UE with a MDT measurement configuration firstly registers to a PLMN, and then registers to another PLMN. According to the prior art, the UE clears the MDT measurement configuration and stops measurement log due to PLMN change. However, an operator may have more than one PLMN codes, e.g. with same MCC but with different MNCs. Therefore, the PLMN that the UE previously registers and currently registers may belong to the same operator. A behavior of invalidating or clearing MDT measurement configuration and logs results in that the network needs to configure MDT measurement configuration for the UE again and waits for the UE to collect measurement logs.

In the second scenario, a UE with MDT measurement configuration selects a closed subscriber group (CSG) cell, but is rejected due to that the UE is not authorized for this CSG. In this situation, UE does not have a registered PLMN (i.e. Registered PLMN changed to "No registered PLMN"), and may selects back to a micro cell in the previously registered PLMN. However, it is not clearly specified that whether the UE staying in the coverage of the previously registered PLMN shall clear the MDT measurement configuration. The behavior of validating or clearing MDT measurement configuration and logs results in that the network needs to configure MDT measurement configuration for the UE again and waits for the UE to collect measurement logs.

In the third scenario, a UE with MDT measurement configuration is rejected by a PLMN with a reject cause in a NAS message sent by the PLMN. The UE validates the MDT measurement configuration and corresponding measurement logs, and keeps measuring if the UE still camps on the PLMN. However, the PLMN considers that the UE is not valid and therefore does not retrieve measurement logs in the UE. This consumes UE power since the UE keeps measuring and consumes UE memory since the UE keeps logging.

In the fourth scenario, it is specified that all related MDT measurement configuration and logging shall be removed by the UE at switch off. However, the UE may perform a detach procedure instead of switch-off by entering a "flight mode" (where radio transmitters are not allowed). However, it is not clear whether the MDT measurement configuration is still valid after the UE enters a normal mode, i.e. performing an attach procedure again. The UE may perform MDT measurement and logging which is not wanted by the network. This unwanted MDT measurement and logging wastes battery power of the UE.

SUMMARY OF THE INVENTION

The application discloses a method of handling minimization of drive tests in a wireless communication system and a related communication device in order to solve the above-mentioned problem.

A method of handling minimization of drive tests, hereafter called MDT, measurement for a mobile device in a wireless communication system is disclosed. The method includes registering to a first public land mobile network, and maintaining MDT measurement configuration when the UE registers to a second public land mobile network belonging to an operator as the first public land mobile network is, or the UE is in coverage of the first public land mobile network but registering to no public land mobile network.

A method of handling minimization of drive tests, hereafter called MDT, measurement for a mobile device in a wireless communication system is disclosed. The method includes registering to a public land mobile network of the wireless communication system, and invalidating a MDT measurement configuration when the mobile device is determined to be invalid for the registered public land mobile network.

A method of handling minimization of drive tests, hereafter called MDT, measurement for a mobile device in a wireless communication system is disclosed. The method comprises configuring with a MDT measurement configuration, and invalidating the MDT measurement configuration when the mobile device performs a detach procedure to a network of the wireless communication system.

A method of handling minimization of drive tests, hereafter called MDT, measurement for a mobile device in a wireless communication system is disclosed. The method comprises collecting measurement logs according to a MDT measurement configuration from a network of the wireless communication system, and determining the collected measurement logs as invalid when the mobile device performs a detach procedure to the network.

A method of handling minimization of drive tests, hereafter called MDT, measurement for a network in a wireless communication system is disclosed. The method comprises configuring a MDT measurement configuration to a mobile device of the wireless communication system, and invalidating the MDT measurement configuration when the mobile device performs a detach procedure to the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
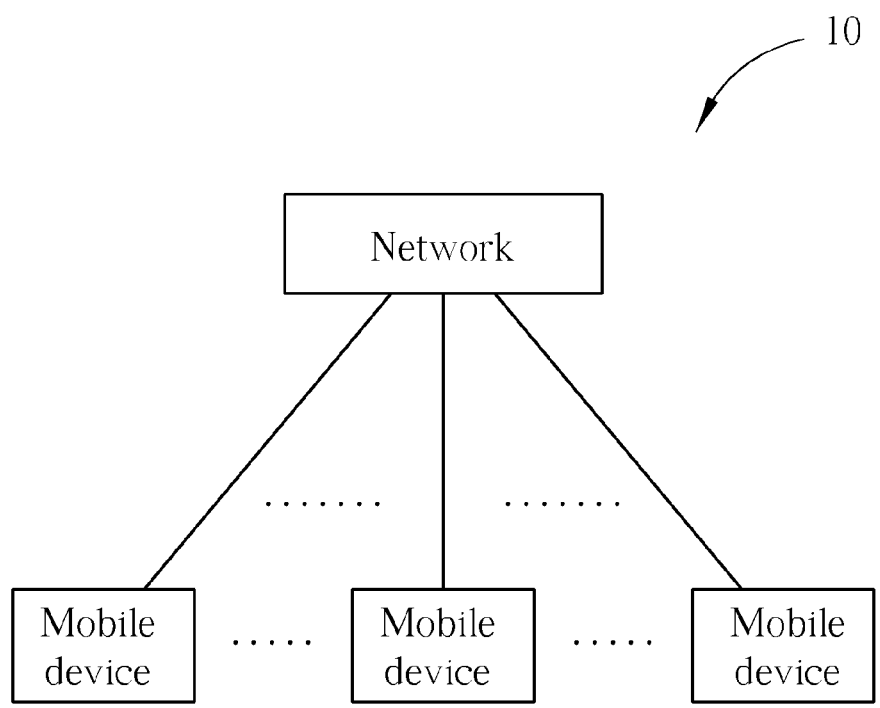
FIG. 1 illustrates a schematic diagram of an exemplary wireless communication system.

Please refer to FIG. 1, which illustrates a schematic diagram of a wireless communication system 10 according to an example. Briefly, the wireless communication system 10 is composed of a network and a plurality of mobile devices. The wireless communication system 10 can be a UMTS (Universal Mobile Telecommunications System), an LTE (long-term evolution) system or any other similar network system. In the LTE system, the network can be referred as a EUTRAN (evolved-UTRAN) comprising a plurality of eNBs or a core network entity (e.g. Mobility Management Entity called MME), whereas the mobile devices are referred as to user equipments (UEs). The UEs can be devices such as mobile phones, computer systems, etc. This terminology will be used throughout the application for ease of reference. However, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
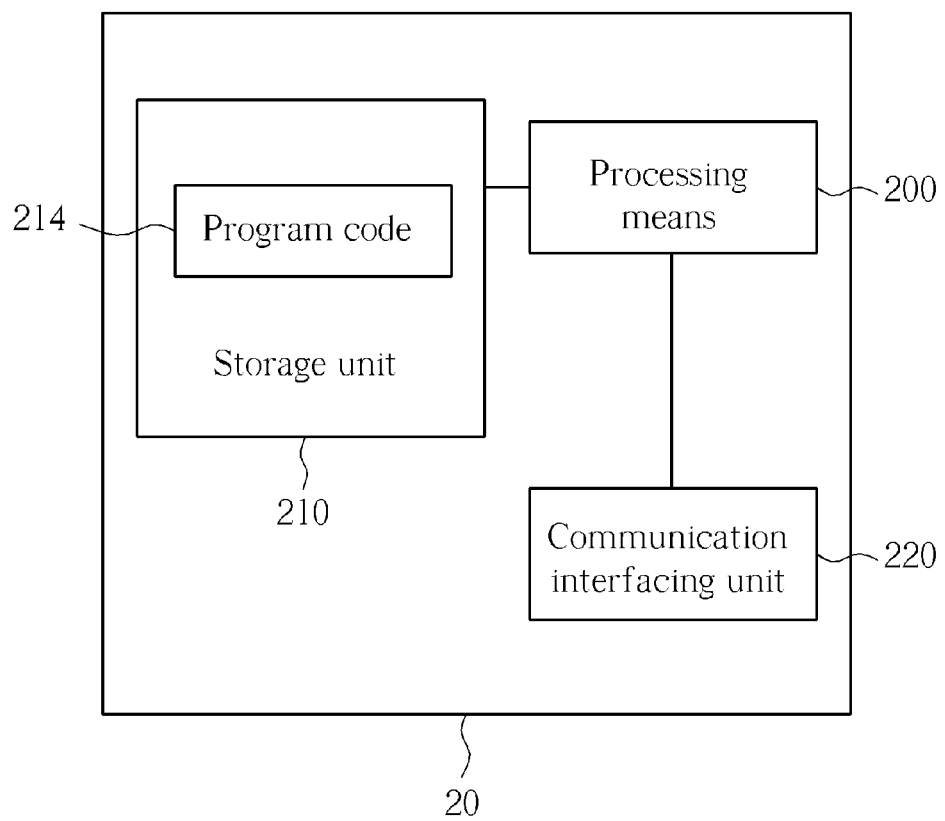
FIG. 2 illustrates a schematic diagram of an exemplary communication device.

FIG. 2 illustrates a schematic diagram of an exemplary communication device 20. The communication device 20 can be the mobile device 10 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
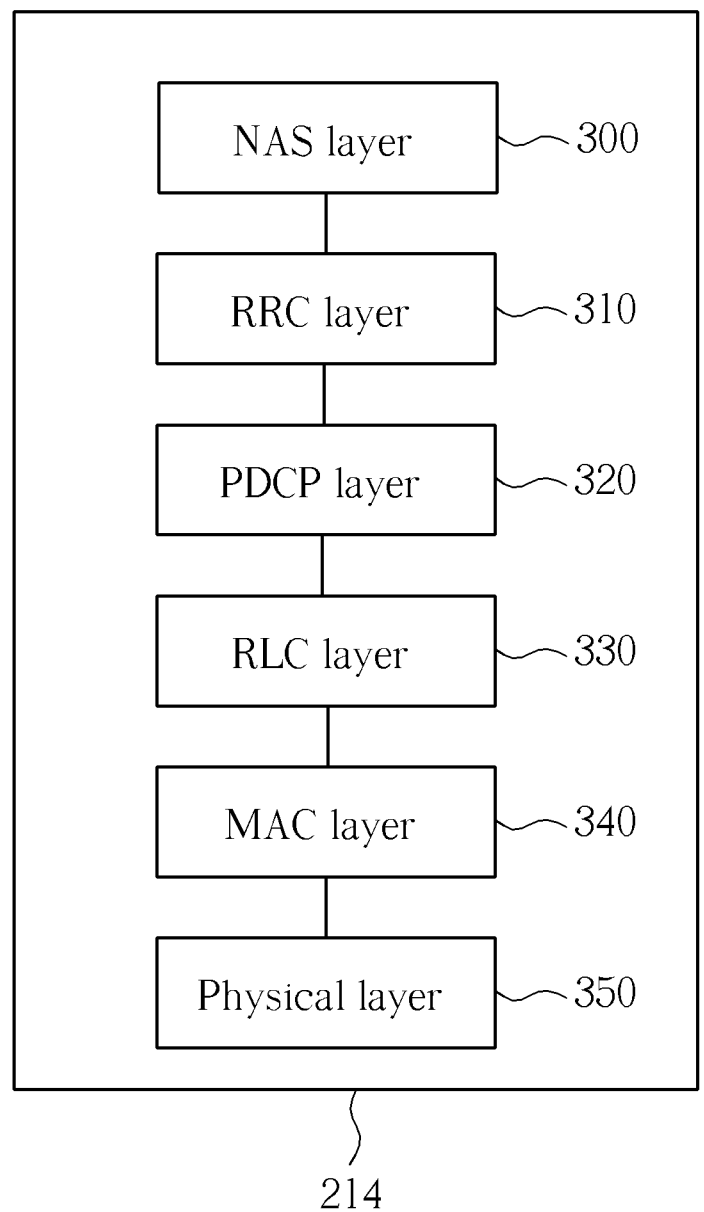
FIG. 3 illustrates a schematic diagram of communication protocol layers for an exemplary communication system.

Please refer to FIG. 3, which illustrates a schematic diagram of communication protocol layers for the LTE system. The behaviors of some of the protocol layers may be defined in the program code 214 and executed by the processing means 200. The protocol layers from top to bottom are a non access stratum (NAS) layer 300, a radio resource control (RRC) layer 310, a packet data convergence protocol (PDCP) layer 320, a radio link control (RLC) layer 330, a medium access control (MAC) layer 340 and a physical (PHY) layer 350. The NAS layer 300 is responsible for Public Land Mobile Network (PLMN) selection, tracking area update, paging, authentication and Evolved Packet System (EPS) bearer establishment, modification and release.

Figure 4:
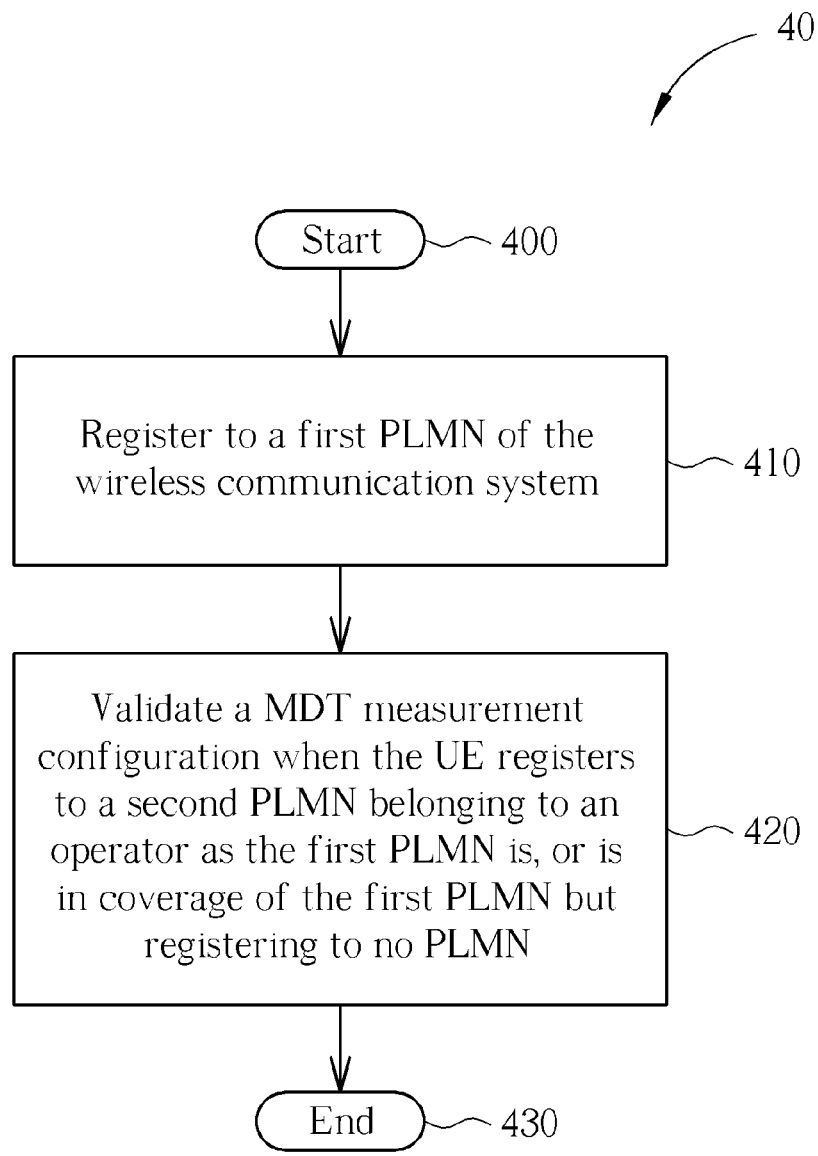
FIG. 4-8 are flowcharts of exemplary processes according to the present disclosure.

Please refer to FIG. 4, which illustrates a flowchart of an exemplary process 40. The process 40 is utilized in a UE for handling MDT measurement, where the UE can be the communication device 20 of FIG. 2. The process 40 may be compiled into the program code 214 and includes the following steps:

Step 400: Start.

Step 410: Register to a first PLMN of the wireless communication system.

Step 420: Validate a MDT measurement configuration when the UE registers to a second PLMN belonging to an operator as the first PLMN is, or is in coverage of the first PLMN but registering to no PLMN.

Step 430: End.

According to the process 40, the UE keeps the MDT measurement configuration when a PLMN change is within the same operator, or is into no registered PLMN. Note that, MDT measurement is used for collecting network (e.g. an eNB) coverage information for deployment purpose for an operator, so it is not necessary for the UE to clear the MDT measurement configuration if the first PLMN and the second PLMN belong to the same operator.

Take an example based on the process 40. A UE with MDT measurement configuration has a first registered PLMN. When the UE is changed from the first registered PLMN to a second registered PLMN and the first registered PLMN and the second registered PLMN are belonging to the same operator, the UE keeps or validates the MDT measurement configuration, so as to avoid unnecessary MDT measurement re-configuration. Note that, the UE may know the first registered PLMN and the second registered PLMN are coordinated (namely belonging to the same operator) from predefined information stored in the UE or Subscriber Identity Module (SIM)/Universal Subscriber Identity Module (USIM), or information explicitly signaled in a RRC message or NAS message by the network. In addition, the UE keeps logging measurement logs corresponding to the MDT measurement configuration.

On the other hand, the UE keeps or validates the MDT measurement configuration when the UE is changed from the first registered PLMN to "No registered PLMN" defined in 3GPP specification TS 23.122, but is still in the coverage of the first registered PLMN. In a word, though the UE is changed from the first registered PLMN to no registered PLMN, it is not necessary to clear the MDT measurement configuration since the UE is still in the coverage of the first registered PLMN. Besides, the UE keeps logging measurement logs corresponding to the MDT measurement configuration. Note that, the UE may be rejected by the network with a cause value, which leads the UE to no registered PLMN. The reject cause value may be #12 (LA not allowed or TA not allowed), #15 (No Suitable Cells in Location Area or No Suitable Cells in Tracking Area), or #25 (Not authorized for this CSG), and has been defined in 3GPP specifications TS 23.122, TS 24.008 and TS 24.301. The definitions of these cause values shall be well-known in the art, so it is not given herein. Note that, if the UE receives a message with cause value #15, the UE searches for a suitable cell in the same PLMN (namely the first registered PLMN).

Based on the process 40, unnecessary invalidating or clearing MDT measurement configuration and measurement log is avoided, so that the network does not need to configure MDT configuration for the UE again and waits for the UE to collect measurement logs.

Figure 5:
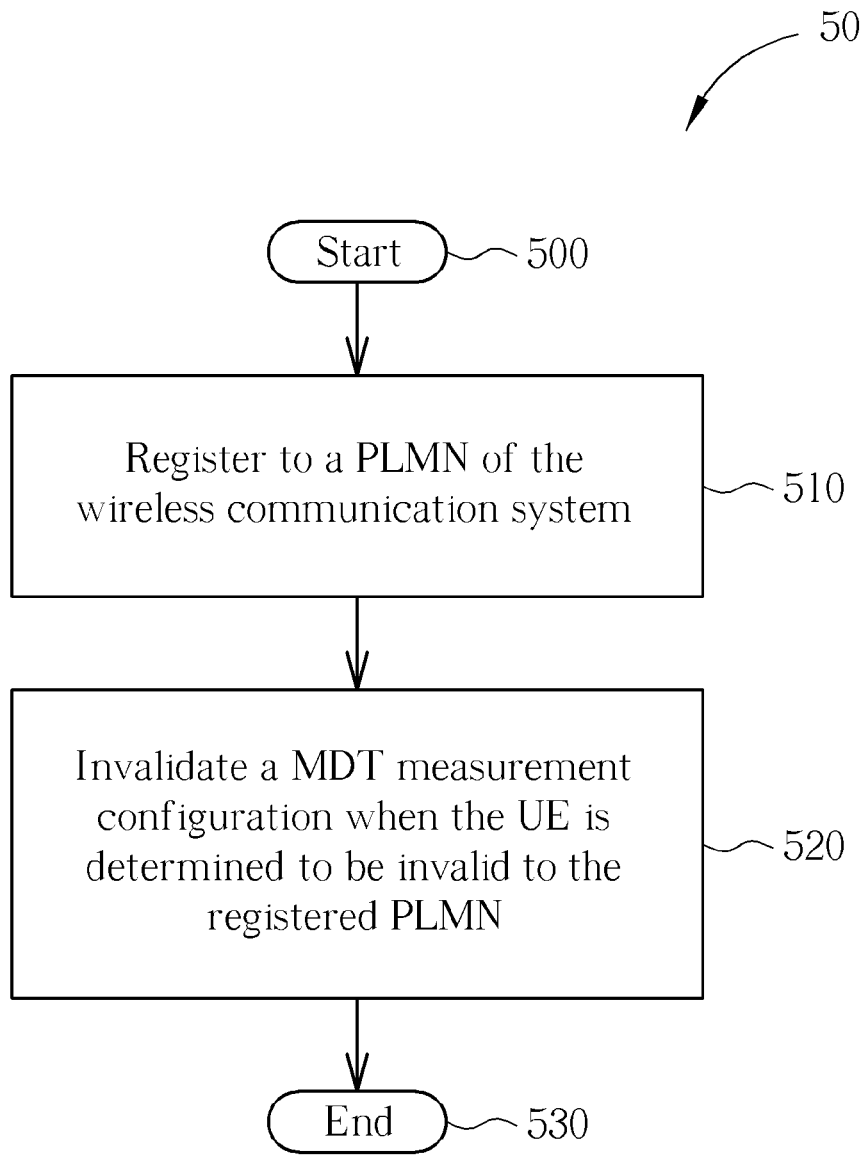

Please refer to FIG. 5, which illustrates a flowchart of an exemplary process 50. The process 50 is utilized in a UE for handling MDT measurement, where the UE can be the communication device 20 of FIG. 2. The process 50 may be compiled into the program code 214 and includes the following steps:

Step 500: Start.
Step 510: Register to a PLMN of the wireless communication system.
Step 520: Invalidate a MDT measurement configuration when the UE is determined to be invalid for the registered PLMN.
Step 530: End.

According to the process 50, the UE does not keep the MDT measurement configuration and measurement log when the UE is rejected by the registered PLMN and determined to be invalid for the registered PLMN, so as to avoid unnecessary measurement consuming UE power and memory.

Take an example based on the process 50. A UE camped on a PLMN is configured with a MDT measurement configuration. When the UE is rejected by the PLMN with a reject cause value, the UE clears or invalidates the MDT configuration even if the UE still camps on the PLMN. More specifically, the UE camped on the PLMN does not keep the MDT measurement configuration and stops logging the measurement logs if the UE is not valid. Since the PLMN determines that the UE is invalid and does not retrieve the measurement logs in the UE, it is not necessary for the UE to validate the MDT measurement configuration and measurement log, so as to decrease power and memory consumption of the UE.

Note that, the reject cause value is used for indicating that the UE or SIM/USIM is invalid in the network. For example, the reject cause value may be #2 (international mobile subscriber identity (IMSI) unknown in Home Location Register (HLR)), #3 (illegal Mobile Station (MS)), #6 (illegal Mobile Equipment (ME)), or #11 (PLMN not allowed). Therefore, when the UE receives the reject cause value, the UE considers as invalidity until switch-off or the SIM/USIM is removed.

Based on the process 50, the UE clears the MDT measurement configuration and stops logging when the UE camped on a PLMN is not valid for the PLMN, so as to avoid unnecessary power and memory consuming.

Figure 6:
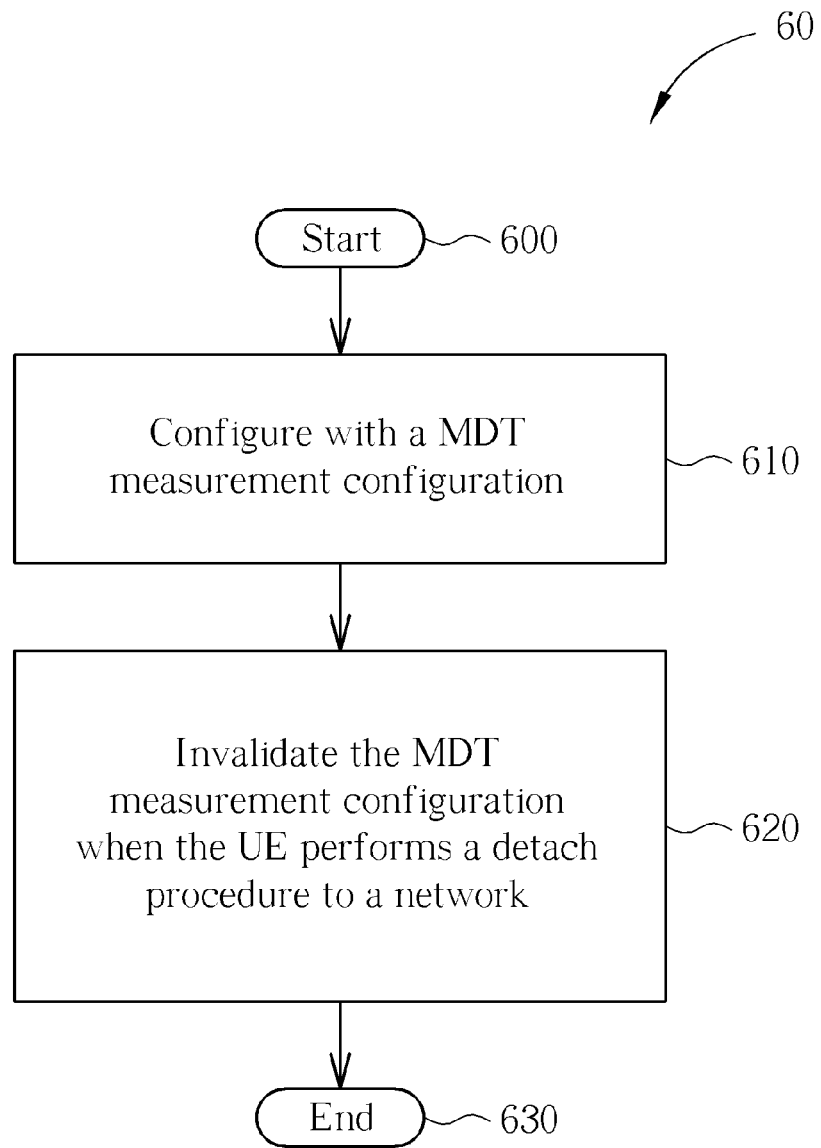

Please refer to FIG. 6, which illustrates a flowchart of an exemplary process 60. The process 60 is utilized in a UE for handling MDT measurement, where the UE can be the communication device 20 of FIG. 2. The process 60 may be compiled into the program code 214 and includes the following steps:

Step 600: Start.
Step 610: Configure with a MDT measurement configuration.
Step 620: Invalidate the MDT measurement configuration when the UE performs a detach procedure to a network.
Step 630: End.

According to the process 60, the UE configured with the MDT measurement configuration determines the MDT measurement configuration as invalid when the UE performs the detach procedure (e.g. local detach where the UE locally detaches without sending a DETACH REQUEST message, UE-initiated detach procedure where the UE sends a DETACH REQUEST message to the network or network-initiated detach procedure where the UE receives a DETACH REQUEST message from the network). The UE may invalidate the MDT measurement configuration by clearing, removing or releasing the MDT measurement configuration. In addition, the UE stops measurement logging corresponding to the MDT measurement configuration.

Note that, after the detach procedure, the UE has to perform an attach procedure before or upon initiating a normal service (e.g. originating call). Moreover, the UE may perform a detach procedure to a network configuring the MDT measurement configuration or to a network not configuring the MDT measurement configuration. For example, the UE receives the MDT measurement configuration in a LTE network, but performs the detach procedure in UMTS network. In this situation, the UE determines the MDT measurement configuration as invalid and may clear the MDT measurement configuration.

Figure 7:
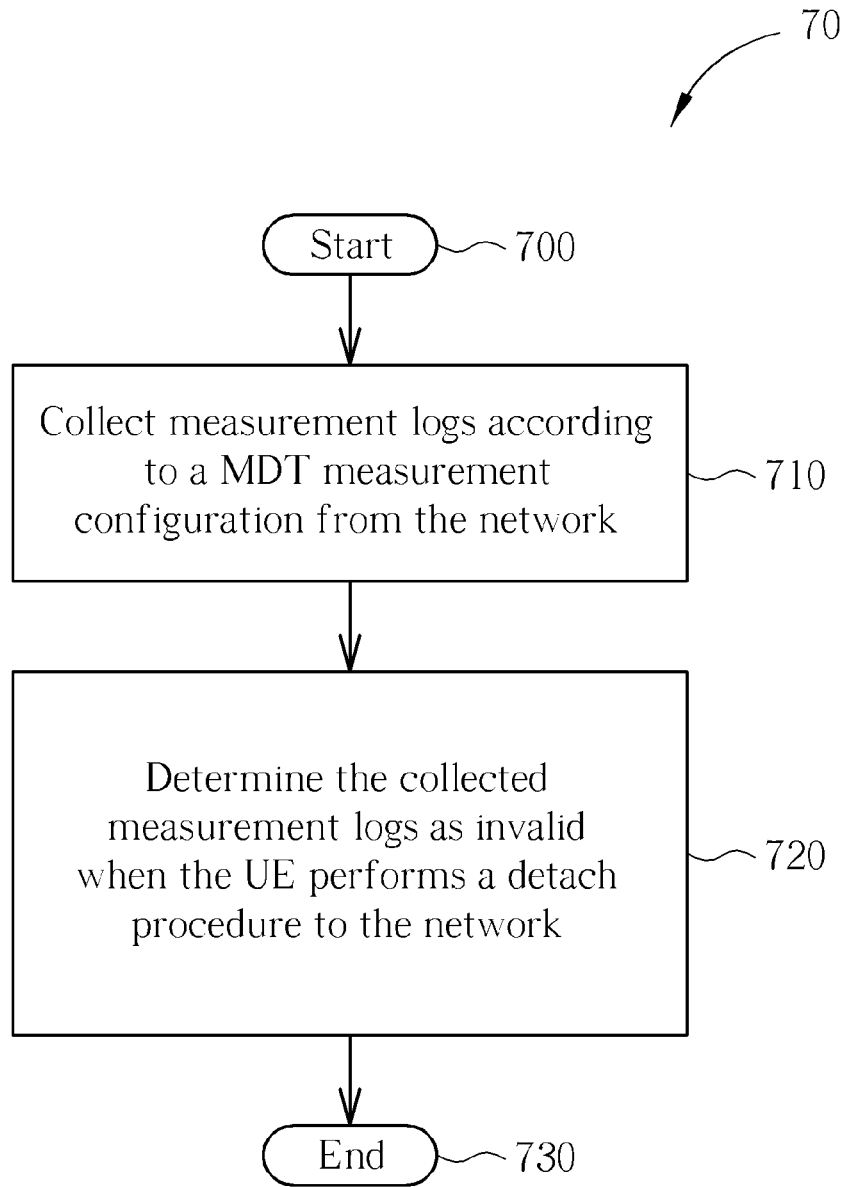

Please refer to FIG. 7, which illustrates a flowchart of an exemplary process 70. The process 70 is utilized in a UE for handling MDT measurement, where the UE can be the communication device 20 of FIG. 2. The process 70 may be compiled into the program code 214 and includes the following steps:

Step 700: Start.
Step 710: Collect measurement logs according to a MDT measurement configuration from the network.
Step 720: Determine the collected measurement logs as invalid when the UE performs a detach procedure to the network.
Step 730: End.

According to the process 70, the UE having measurement logs determines the measurement logs as invalid when the UE is detached from a network configuring the MDT measurement configuration. In addition, the UE may clear the measurement logs. Note that, the UE detached from the network has to perform an attach procedure before or upon initiating a normal service.

Figure 8:
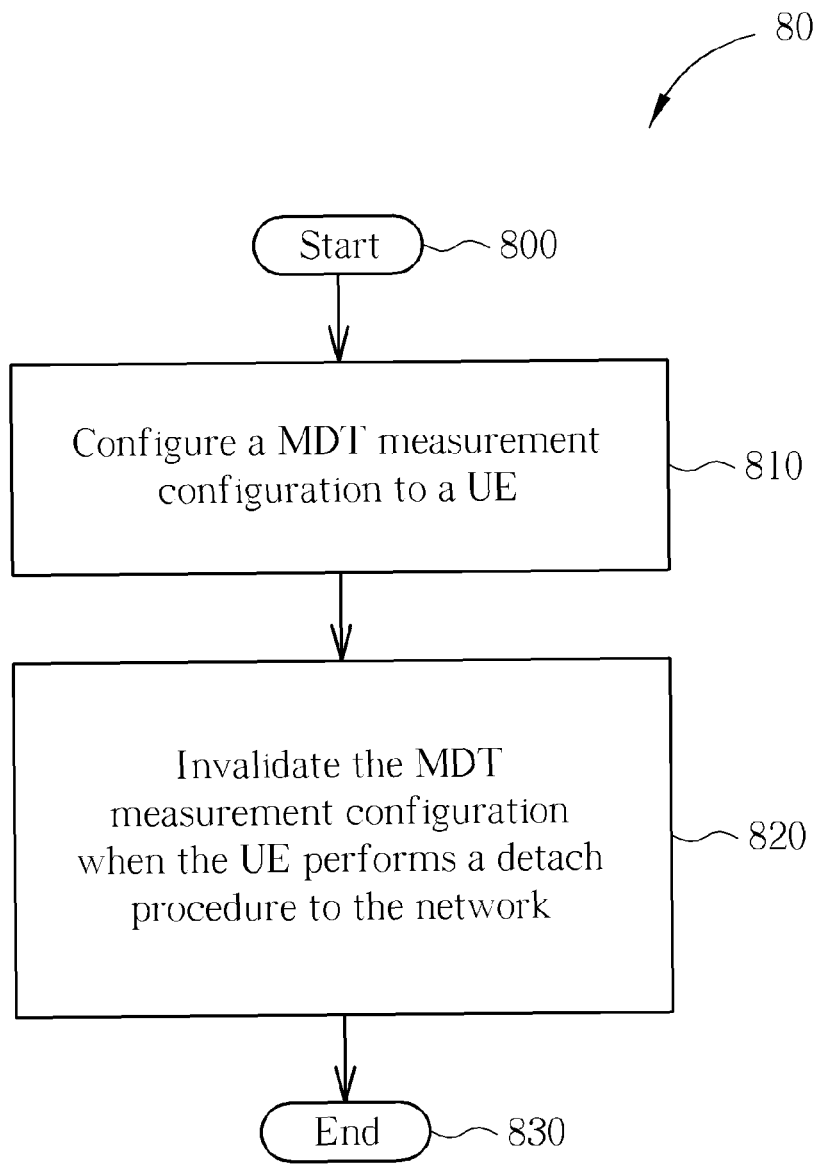

Please refer to FIG. 8, which illustrates a flowchart of an exemplary process 80. The process 80 is utilized in a network for handling MDT measurement. The process 80 may be compiled into the program code 214 and includes the following steps:

Step 800: Start.

Step 810: Configure a MDT measurement configuration to a UE.

Step 820: Invalidate the MDT measurement configuration when the UE performs a detach procedure to the network.

Step 830: End.

According to the process 80, the network configuring the MDT measurement configuration to the UE determines the MDT measurement configuration as invalid when the UE is detached from the network, and clears the MDT measurement configuration.

Based on the processes 60-80, whether the MDT measurement configuration and/or measurement logs are/is valid when the UE performs a detach procedure is clearly defined. After the UE performs an attach procedure to reenter the normal mode, the UE does not perform undesired MDT measurement, thereby avoiding power waste.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary examples and means are provided for correctly handling MDT measurement configuration and measurement logs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling minimization of drive tests (MDT) measurement for a mobile device in a wireless communication system, the method comprising:
 registering to a first public land mobile network of the wireless communication system, wherein the mobile device is configured with an MDT measurement configuration received from the first public land mobile network; and
 performing the following steps:
  continuing performing measurement logging in a second public land mobile network according to the MDT measurement configuration when the mobile device registers to the second public land mobile network belonging to the same operator as the first public land mobile network; and
 continuing performing measurement logging in the first public land mobile network according to the MDT measurement configuration when the mobile device is in coverage of the first public land mobile network but rejected by the first public land mobile network, wherein the mobile device is rejected by receiving a message with a reject cause of that a location area or tracking area is not allowed for the mobile device, no suitable cell is in the location area or tracking area, or a closed subscriber group of the first public land mobile network is not authorized to the mobile device.

2. A method of handling minimization of drive tests (MDT) measurement for a mobile device in a wireless communication system, the method comprising:
 registering to a public land mobile network of the wireless communication system;
 invalidating a MDT measurement configuration when the mobile device is rejected by the registered public land mobile network (PLMN) with a reject cause in a non-access stratum (NAS) message sent by the PLMN, comprising:
  invalidating the MDT measurement configuration when the mobile device is rejected by the registered public land mobile network with the reject cause, wherein the reject cause is that an international mobile subscriber identity (IMSI) of the mobile device is unknown in a home location register of the wireless communication system, the mobile device is illegal, or the public land mobile network is not allowed; and
 stopping measurement logging corresponding to the MDT measurement configuration.

3. A mobile device of a wireless communication system for handling minimization of drive tests (MDT) measurement, the mobile device comprising:
 a processing means, for executing a program; and
 a storage unit, coupled to the processing means, for storing the program which instructs the processing means to perform the following steps:
  registering to a public land mobile network of the wireless communication system;
  invalidating a MDT measurement configuration when the mobile device is rejected by the registered public land mobile network (PLMN) with a reject cause in a non-access stratum (NAS) message sent by the PLMN, comprising:
   invalidating the MDT measurement configuration when the mobile device is rejected by the registered public land mobile network with the reject cause, wherein the reject cause is that an international mobile subscriber identity (IMSI) of the mobile device is unknown in a home location register of the wireless communication system, the mobile device is illegal, or the public land mobile network is not allowed; and
  stopping logging corresponding to the MDT measurement configuration.

* * * * *